United States Patent
Zhu et al.

(10) Patent No.: US 9,160,134 B2
(45) Date of Patent: Oct. 13, 2015

(54) LASER

(71) Applicants: Tsinghua University, Beijing (CN); HON HAI PRECISION INDUSTRY CO., LTD., New Taipei (TW)

(72) Inventors: Jun Zhu, Beijing (CN); Jing-Lei Zhu, Beijing (CN); Qun-Qing Li, Beijing (CN); Kai-Li Jiang, Beijing (CN); Chen Feng, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/137,236

(22) Filed: Dec. 20, 2013

(65) Prior Publication Data

US 2014/0177666 A1  Jun. 26, 2014

(30) Foreign Application Priority Data

Dec. 26, 2012  (CN) .......................... 2012 1 0573098

(51) Int. Cl.
*H01S 3/08* (2006.01)
*H01S 3/223* (2006.01)

(52) U.S. Cl.
CPC ........... *H01S 3/08068* (2013.01); *H01S 3/2232* (2013.01)

(58) Field of Classification Search
CPC ..... H01S 3/0405; H01S 3/0407; H01S 3/042; H01S 3/0604; H01S 3/0627; H01S 3/07; H01S 3/08; H01S 3/08068; H01S 3/082; H01S 3/105; H01S 5/0071; H01S 5/0206
USPC .................................................. 372/55, 61, 99
See application file for complete search history.

(56) References Cited

U.S. PATENT DOCUMENTS

| | | | | |
|---|---|---|---|---|
| 5,058,123 A * | 10/1991 | Yasui et al. | ...................... | 372/99 |
| 5,151,917 A * | 9/1992 | Perilloux et al. | ............... | 372/102 |
| 5,210,768 A * | 5/1993 | Seguin | ............................ | 372/92 |
| 5,506,858 A * | 4/1996 | Takenaka et al. | ................ | 372/92 |
| 6,263,007 B1 * | 7/2001 | Tang | ................................ | 372/59 |
| 2010/0098127 A1 * | 4/2010 | Higuchi et al. | ............ | 372/50.11 |

* cited by examiner

*Primary Examiner* — Xinning Niu
*Assistant Examiner* — Vu A Vu
(74) *Attorney, Agent, or Firm* — Novak Druce Connolly Bove + Quigg LLP

(57) ABSTRACT

A laser includes a total reflective mirror, an output mirror, a discharge lamp, and an active laser medium. The total reflective mirror, the output mirror, and the discharge lamp define a resonant cavity. The active laser medium is filled in the resonant cavity. The total reflective mirror includes a microstructure. The microstructure is convex ring-shaped structure. The convex ring-shaped structure has a height and a width, and both the height and the width are in a range from about $0.5\lambda$ to about $2\lambda$, while $\lambda$ is a working wavelength of the laser.

20 Claims, 17 Drawing Sheets

LASER

CROSS-REFERENCE TO RELATED APPLICATIONS

This application claims all benefits accruing under 35 U.S.C. §119 from China Patent Application No. 201210573098.0, filed on Dec. 26, 2012 in the China Intellectual Property Office. This application is also related to application entitled, "LASER", filed Dec. 20, 2013 Ser. No. 14/137,248, "LASER", filed Dec. 20, 2013 Ser. No. 14/132,219, "LASER", filed Dec. 20, 2013 Ser. No. 14/137,197, and "LASER", filed Dec. 20, 2013 Ser. No. 14/137,185. Disclosures of the above-identified applications are incorporated herein by reference.

BACKGROUND

1. Technical Field

The present disclosure relates to lasers.

2. Description of Related Art

Because of the high power levels available, a variety of lasers are frequently used in industrial applications such as cutting and welding, and in military applications such as laser weapons.

Most of the high power lasers are multi-mode lasers, and the laser beams have large divergence angle, shallow depth of focus, low stability, and high power density loss during long distance transmission.

What is needed, therefore, is to provide a laser in which the laser beam has small divergence angle, long depth of focus, small spot size, and low power density loss during long distance transmission.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
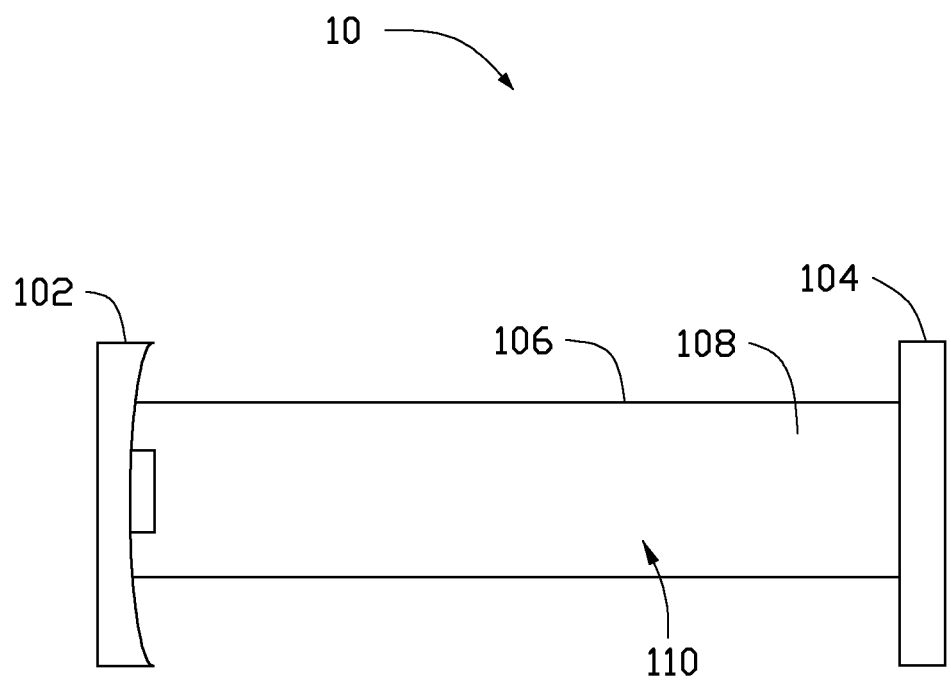
FIG. 1 is a schematic diagram of a laser according to one embodiment.

FIG. 1 is an embodiment of a laser 10. The laser 10 includes a total reflective mirror 102, an output mirror 104, a discharge lamp 106, and an active laser medium 108. The total reflective mirror 102 and the output mirror 104 are separately configured on two opposite ends of the discharge lamp 106. The total reflective mirror 102, the output mirror 104, and the discharge lamp 106 define a resonant cavity 110. The active laser medium 108 is filled in the resonant cavity 110.

Similar to some prior art, the laser 10 further includes two electrodes, a water-cooled jacket, a water inlet, a water outlet, a gas reservoir, a gas tube, and other components (not shown in FIG. 1).

Figure 2:
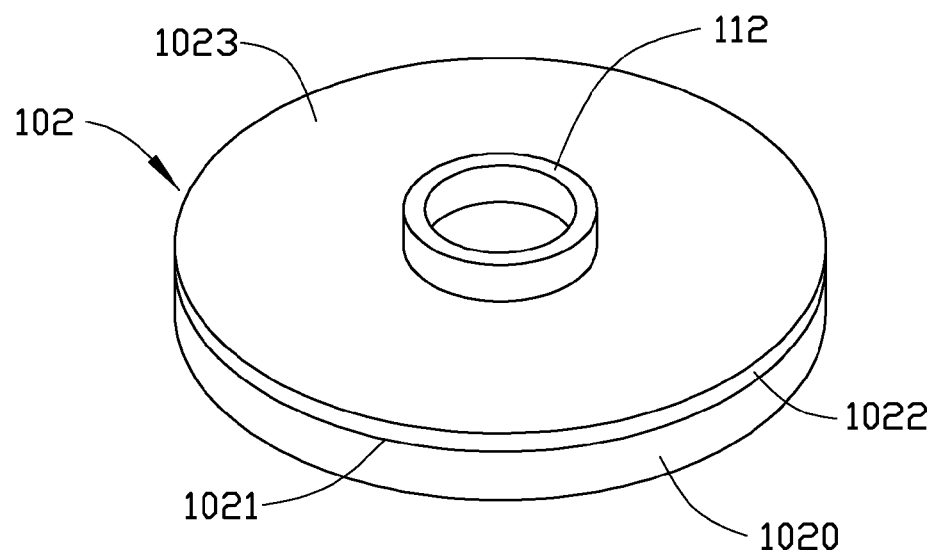
FIG. 2 is a schematic diagram of a total reflective mirror in the laser of FIG. 1.
Figure 3:
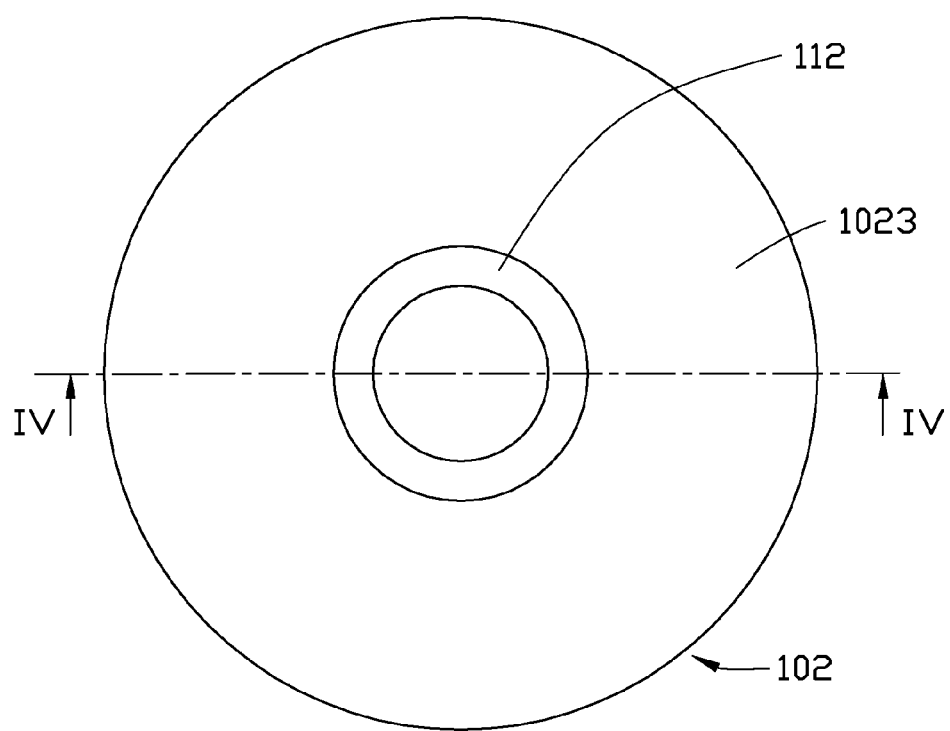
FIG. 3 is a plan view of the total reflective mirror of FIG. 2.

FIG. 2 and FIG. 3 show that the total reflective mirror 102 is a spherical mirror having a curvature radius ranging from about 0.5 meters to about 5 meters. In one embodiment, the curvature radius of the total reflective mirror 102 is 1.5 meters.

The total reflective mirror 102 includes a body 1020 defining a first reflective surface 1021, and a metal film 1022 coated on the first reflective surface 1021 of the body 1020. The metal film 1022 has a second reflective surface 1023, which faces the output mirror 104. The total reflective mirror 102 further includes a microstructure 112.

The body 1020 is made of a nonmetal which is not easy to deform under heating, such as silicon, silicon oxide, and silicon carbide. In one embodiment, the body 1020 is made of silicon. The body 1020 has a diameter ranging from about 5 millimeters to about 50 millimeters. In one embodiment, the body 1020 has a diameter of 20 millimeters. The body 1020 has a thickness ranging from about 2 millimeters to about 20 millimeters. In one embodiment, the body 1020 has a thickness of 5 millimeters.

The metal film 1022 is made of a metal which has high melting point, it is difficult to be oxidized, and can produce surface plasma. In one embodiment, gold is used to make the metal film 1022. The metal film 1022 has a thickness which is greater than its skin depth. In one embodiment, the thickness of the metal film 1022 is greater than 50 nanometers. The metal film 1022 can be coated onto the first reflective surface 1021 of the body 1020 by electroplating, depositing, sputtering, spraying, or any other coating methods.

Figure 4:
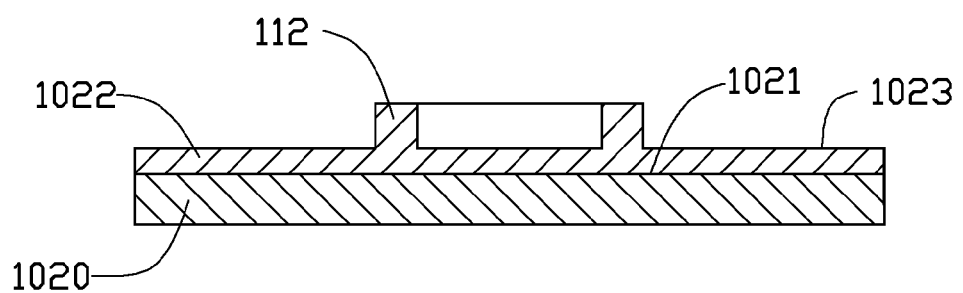
FIG. 4 is a cross-sectional view of the total reflective mirror of FIG. 2 according to one embodiment.

FIG. 4 shows that in one embodiment, the microstructure 112 protrudes from the second reflective surface 1023 of the metal film 1022. The microstructure 112 can be formed on the second reflective surface 1023 by electroplating, depositing, sputtering, spraying, or any other coating methods with the aid of a mask. In one embodiment, the microstructure 112 and the metal film 1022 are formed as one piece.

Figure 5:
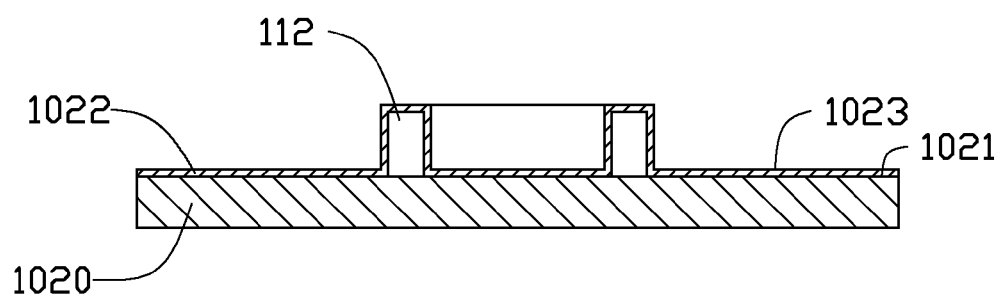
FIG. 5 is a cross-sectional view of the total reflective mirror of FIG. 2 according to another embodiment.

FIG. 5 shows that in another embodiment, the microstructure 112 protrudes from the first reflective surface 1021 of the body 1020. The metal film 1022 covers both the first reflective surface 1021 and the microstructure 112. The microstructure 112 is located close to a center of the first reflective surface 1021. In one embodiment, the microstructure 112 is located on the center of the first reflective surface 1021. The material for the microstructure 112 is the same as that of the body 1020. The microstructure 112 can be formed by etching the body 1020 with the aid of a mask. In one embodiment, the microstructure 112 and the body 1020 are formed as one piece.

The microstructure 112 is a convex ring-shaped structure. The microstructure 112 has a height relating to a working wavelength of the laser 10. The height is in a range from about $0.5\lambda$ to about $2\lambda$, wherein $\lambda$ is the working wavelength of the laser 10. In one embodiment, the height of the microstructure 112 is $0.5\lambda$. The working wavelength of the laser 10 is determined by the active laser medium 108. In one embodiment, the active laser medium 108 is carbon dioxide ($CO_2$), and the working wavelength $\lambda$ is 10.6 micrometers. The height of the microstructure 112 is in a range from about 5.3 micrometers to about 21.2 micrometers. In one embodiment, the height of the microstructure 112 is 5.3 micrometers.

The microstructure 112 has a width (the outside radius of the convex ring-shaped structure minus the inside radius of the convex ring-shaped structure) relating to the working wavelength $\lambda$ of the laser 10. The width is in a range from about $0.5\lambda$ to about $2\lambda$. In one embodiment, the width of the microstructure 112 is $0.5\lambda$. The working wavelength $\lambda$ of the laser 10 is determined by the active laser medium 108. In one embodiment, the active laser medium 108 is carbon dioxide ($CO_2$), and the working wavelength $\lambda$ is 10.6 micrometers. The width of the microstructure 112 is in a range from about 5.3 micrometers to about 21.2 micrometers. In one embodiment, the width of the microstructure 112 is 5.3 micrometers.

While the height and the width of the microstructure 112 are both in a range from about $0.5\lambda$ to about $2\lambda$, then the laser beam obtained by the laser 10 will have a relatively small divergence angle and spot size.

The output mirror 104 is a flat mirror. A diameter can be same as the body 1020 of the total reflective mirror 102. In one embodiment, the diameter of the output mirror 104 is 20 millimeters. The output mirror 104 is a partial reflective mirror. A reflectivity of the output mirror 104 ranges from about 25% to about 55%. The output mirror 104 is made of germanium, zinc selenide, or gallium arsenide. In one embodiment, the output mirror 104 is made of zinc selenide.

The discharge lamp 106 is a quartz glass tube. The discharge lamp 106 has a diameter smaller than that of the output mirror 104. In one embodiment, the diameter of the discharge lamp 106 is in a range from about 2 millimeters to about 10 millimeters. In another embodiment, the diameter of the discharge lamp 106 is in a range from about 5 millimeters to about 6 millimeters.

The active laser medium 108 can be gas, such as $CO_2$, helium (He), neon (Ne), nitrogen ($N_2$), and carbon oxide (CO). The active laser medium 108 can also be solid, liquid, or semi-conductor. In one embodiment, the active laser medium 108 is $CO_2$.

The resonant cavity 110 has a length of about 400 millimeters to about 800 millimeters. In one embodiment, the length of the resonant cavity 110 ranges from about 500 millimeters to about 600 millimeters. In another embodiment, the length of the resonant cavity 110 is 600 millimeters.

Figure 6:
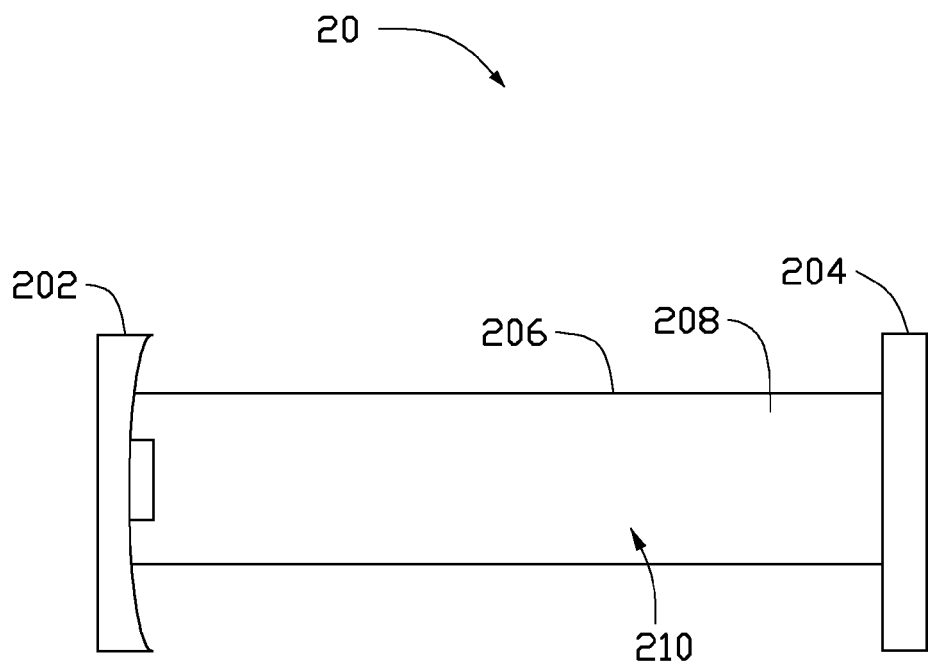
FIG. 6 is a schematic diagram of a laser according to another embodiment.

FIG. 6 shows that a laser 20 of another embodiment includes a total reflective mirror 202, an output mirror 204, a discharge lamp 206, and an active laser medium 208. The total reflective mirror 202 and the output mirror 204 are separately configured on two opposite ends of the discharge lamp 206. The total reflective mirror 202, the output mirror 204, and the discharge lamp 206 define a resonant cavity 210. The active laser medium 208 is filled in the resonant cavity 210.

Figure 7:
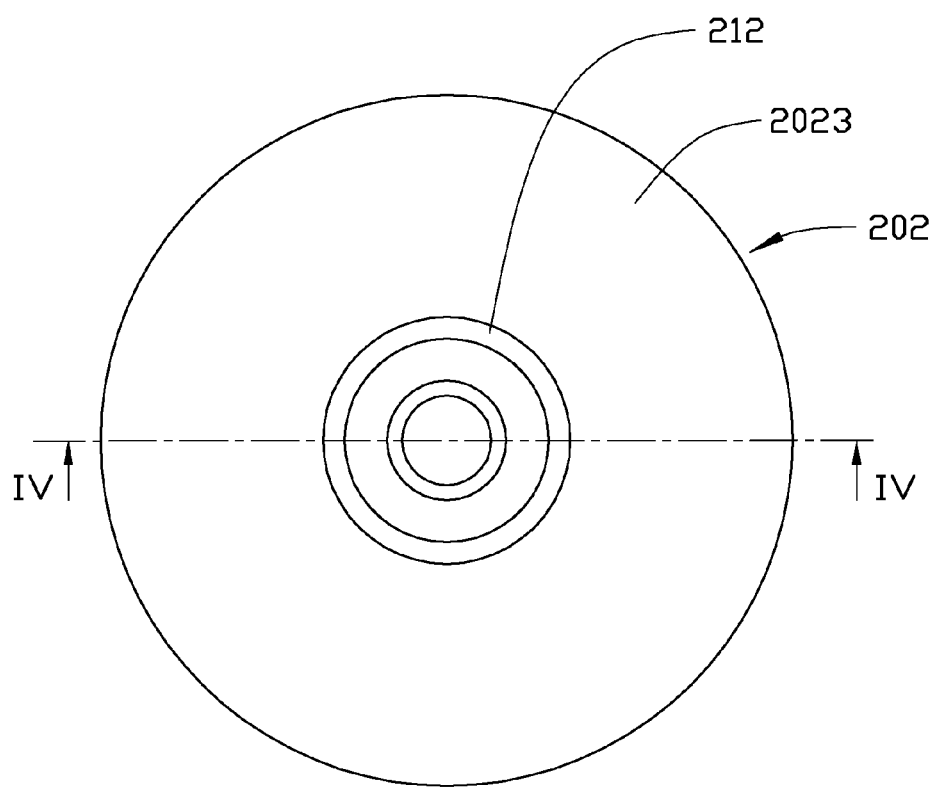
FIG. 7 is a plan view of a total reflective mirror of FIG. 6.

FIG. 7 shows that the total reflective mirror 202 includes a body 2020 defining a first reflective surface 2021, and a metal film 2022 coated on the first reflective surface 2021 of the body 2020. The metal film 2022 has a second reflective surface 2023, which faces the output mirror 204. Different from the laser 10, the total reflective mirror 202 further includes a plurality of microstructures 212. The plurality of microstructures 212 is concentrically configured.

Figure 8:
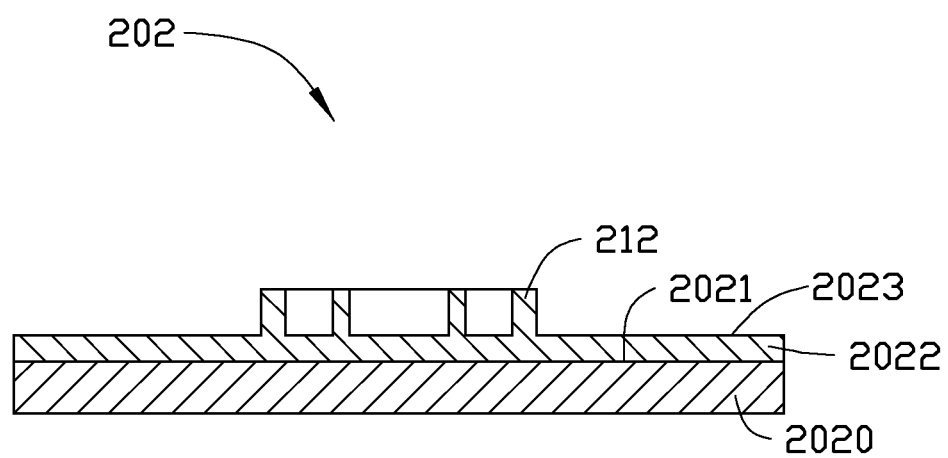
FIG. 8 is a cross-sectional view of the total reflective mirror of FIG. 6 according to one embodiment.

FIG. 8 shows that in one embodiment, the plurality of microstructures 212 protrudes from the second reflective surface 2023 of the metal film 2022. The plurality of microstructures 212 is located close to a center of the second reflective surface 2023. In one embodiment, the center of the second reflective surface 2023 is set as a center of all the plurality of microstructures 212. The material for the plurality of microstructures 212 is the same as that of the metal film 2022. The plurality of microstructures 212 can be formed on the second reflective surface 2023 by electroplating, depositing, sputtering, spraying, or any other coating methods with the aid of a mask. In one embodiment, the plurality of microstructures 212 and the metal film 2022 are formed as one piece.

Figure 9:
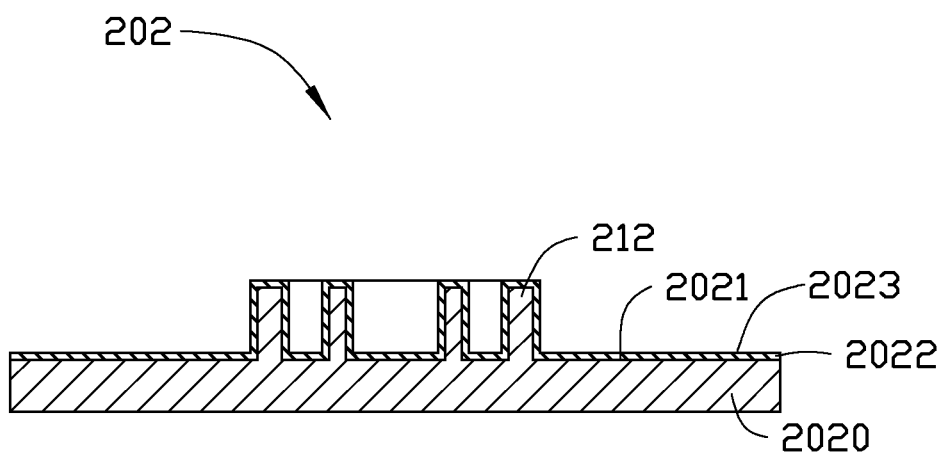
FIG. 9 is a cross-sectional view of the total reflective mirror of FIG. 6 according to another embodiment.

FIG. 9 shows that in another embodiment, the plurality of microstructures 212 protrudes from the first reflective surface 2021 of the body 2020. The metal film 2022 covers both the first reflective surface 2021 and the plurality of microstructures 212. The plurality of microstructures 212 is located close to a center of the first reflective surface 2021. In one embodiment, the center of the first reflective surface 2023 is set as a center of all the plurality of microstructures 212. The material for the plurality of microstructures 212 is the same as that of the body 2020. The plurality of microstructures 212 can be formed by etching the body 2020 with the aid of a mask. In one embodiment, the plurality of microstructures 212 and the body 2020 are formed as one piece.

Similar to the laser 10, each of the plurality of microstructures 212 is a convex ring-shaped structure. Each of the plurality of microstructures 212 in the laser 20 has a height ranging from about $0.5\lambda$ to about $2\lambda$, wherein $\lambda$ is the working wavelength of the laser 20. In one embodiment, the plurality of microstructures 212 has a same height. In another embodiment, the same height is $0.5\lambda$. In another embodiment, the plurality of microstructure 212 has different heights. When the active laser medium 208 is $CO_2$, each of the plurality of microstructure 212 has a height ranging from about 5.3 micrometers to about 21.2 micrometers.

Similar to the laser 10, each of the plurality of microstructures 212 in the laser 20 has a width ranging from about $0.5\lambda$ to about $2\lambda$. In one embodiment, the plurality of microstructures 212 has a same width. In another embodiment, the same width is $0.5\lambda$. In another embodiment, the plurality of microstructures 212 has different widths. When the active laser medium 208 is $CO_2$, each of the plurality of microstructures 212 has a width ranging from about 5.3 micrometers to about 21.2 micrometers.

There is an interval between each two adjacent microstructures 212. Each interval has a size ranging from about $0.5\lambda$ to about $2\lambda$. In one embodiment, each interval has a same size. In another embodiment, the same size of all the intervals is $\lambda$. When the active laser medium 208 is $CO_2$, each interval has a size ranging from about 5.3 micrometers to about 21.2 micrometers.

The other components of the laser 20 are all the same as that of the laser 10.

Compared with the laser 10 having one microstructure 112, the laser 20 has a plurality of microstructures 212 additionally, each interval between each two adjacent microstructures 212 has a size ranging from about $0.5\lambda$ to about $2\lambda$, therefore, the surface plasma resonance produced in the resonant cavity 210 is more remarkable. A laser beam which has a long depth of focus, and low power density loss during long distance transmission can then be obtained.

Figure 10:
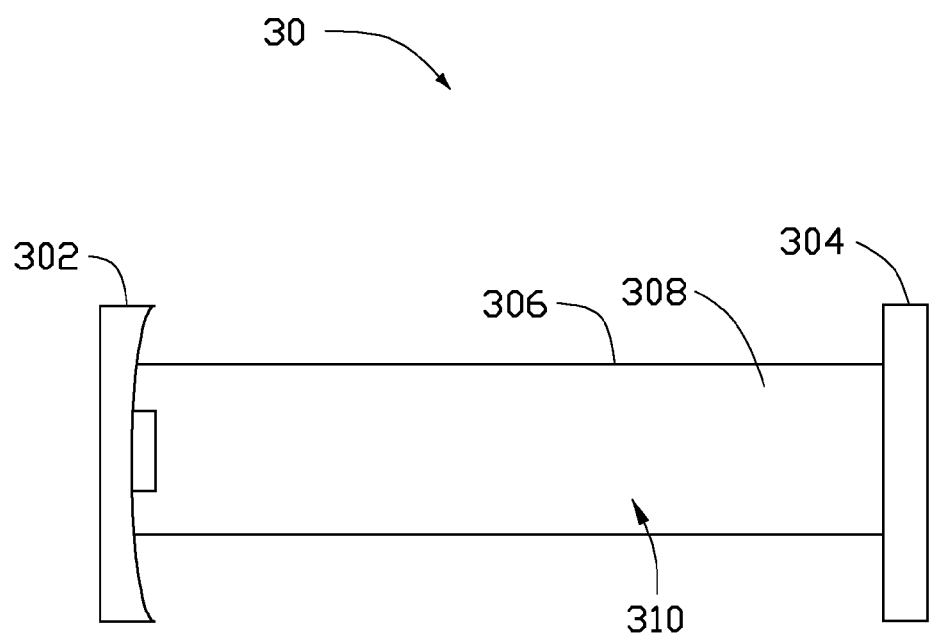
FIG. 10 is a schematic diagram of a laser according to another embodiment.

FIG. 10 shows that a laser 30 of another embodiment includes a total reflective mirror 302, an output mirror 304, a discharge lamp 306, and an active laser medium 308. The total reflective mirror 302 and the output mirror 304 are separately configured on two opposite ends of the discharge lamp 306. The total reflective mirror 302, the output mirror 304, and the discharge lamp 306 define a resonant cavity 310. The active laser medium 308 is filled in the resonant cavity 310.

Figure 11:
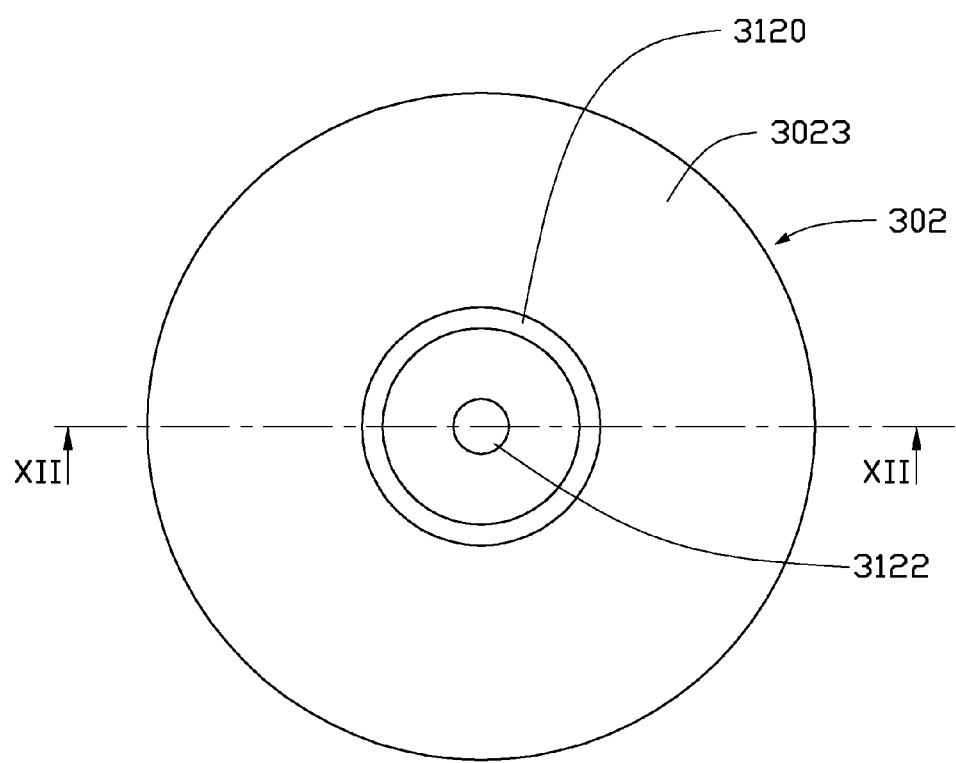
FIG. 11 is a plan view of a total reflective mirror of FIG. 10.

FIG. 11 shows that the total reflective mirror 302 includes a body 3020 defining a first reflective surface 3021, and a metal film 3022 coated on the first reflective surface 3021 of the body 3020. The metal film 3022 has a second reflective surface 3023, which faces the output mirror 304. Different from the laser 10, the total reflective mirror 302 further includes a first microstructure 3120 and a second microstructure 3122. The first microstructure 3120 and the second microstructure 3122 are concentrically configured.

Figure 12:
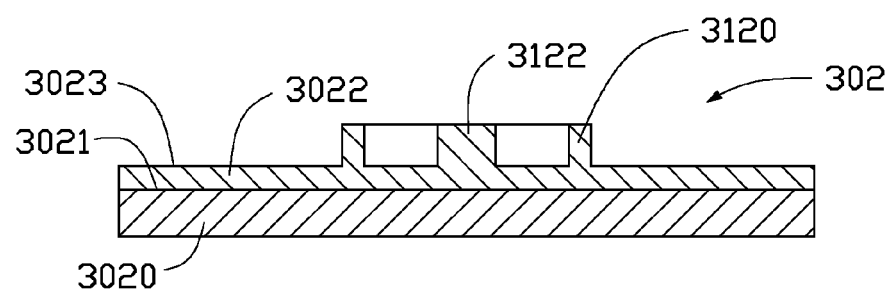
FIG. 12 is a cross-sectional view of the total reflective mirror of FIG. 10 according to one embodiment.

FIG. 12 shows that in one embodiment, both the first microstructure 3120 and the second microstructure 3122 protrude from the second reflective surface 3023 of the metal film 3022. Both the first microstructure 3120 and the second microstructure 3122 are located close to a center of the second reflective surface 3023. In one embodiment, the center of the second reflective surface 3023 is set as a center of both the first microstructure 3120 and the second microstructure 3122. The material for both the first microstructure 3120 and the second microstructure 3122 are the same as that of the metal film 3022. Both the first microstructure 3120 and the second microstructure 3122 can be formed on the second reflective surface 3023 by electroplating, depositing, sputtering, spraying, or any other coating methods with the aid of a mask. In one embodiment, the first microstructure 3120, the second microstructure 3122, and the metal film 3022 are formed as one piece.

Figure 13:
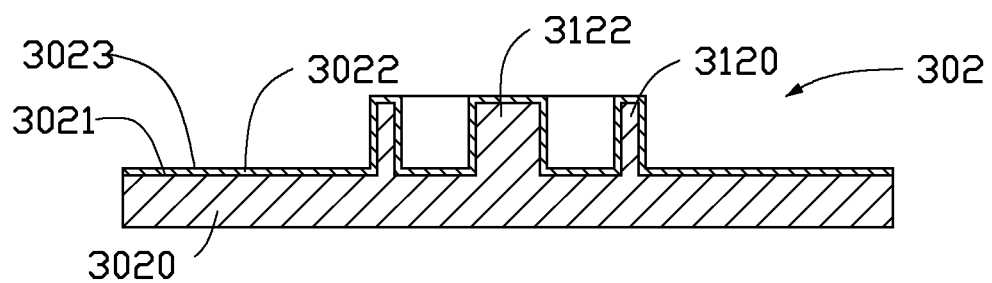
FIG. 13 is a cross-sectional view of the total reflective mirror of FIG. 10 according to another embodiment.

FIG. 13 shows that in another embodiment, both the first microstructure 3120 and the second microstructure 3122 protrude from the first reflective surface 3021 of the body 3020. The metal film 3022 covers the first reflective surface 3021, the first microstructure 3120, and the second microstructure 3122. Both the first microstructure 3120 and the second microstructure 3122 are located close to a center of the first reflective surface 3021. In one embodiment, the center of the first reflective surface 3023 is set as a center of both the first microstructure 3120 and the second microstructure 3122. The material for both the first microstructure 3120 and the second microstructure 3122 are the same as that of the body 3020. Both the first microstructure 3120 and the second microstructure 3122 can be formed by etching the body 3020 with the aid of a mask. In one embodiment, the first microstructure 3120, the second microstructure 3122, and the body 3020 are formed as one piece.

The shape, structure, and size of the first microstructure 3120 are all the same of that of the microstructure 112.

The second microstructure 3122 is a cylinder. The second microstructure 3122 has a height relating to a working wavelength of the laser 30. The height is in a range from about $0.5\lambda$ to about $2\lambda$, wherein $\lambda$ is the working wavelength of the laser 30. In one embodiment, the height of the second microstructure 3122 is $0.5\lambda$. The working wavelength of the laser 30 is determined by the active laser medium 108. In one embodiment, the active laser medium 308 is carbon dioxide ($CO_2$), and the working wavelength $\lambda$ is 10.6 micrometers. The height of the second microstructure 3122 is in a range from about 5.3 micrometers to about 21.2 micrometers. In one embodiment, the height of the second microstructure 3122 is 5.3 micrometers.

The second microstructure 3122 has a diameter relating to a working wavelength $\lambda$ of the laser 30. The diameter is in a range from about $0.5\lambda$ to about $2\lambda$. In one embodiment, the lateral size of the second microstructure 3122 is $0.5\lambda$. The working wavelength $\lambda$ of the laser 30 is determined by the active laser medium 308. In one embodiment, the active laser medium 308 is carbon dioxide ($CO_2$), and the working wavelength $\lambda$ is 10.6 micrometers. The diameter of the second microstructure 3122 is in a range from about 5.3 micrometers to about 21.2 micrometers. In one embodiment, the diameter of the second microstructure 3122 is 5.3 micrometers.

The first microstructure 3120 and the second microstructure 3122 can have a same height. In one embodiment, the same height is $0.5\lambda$. The first microstructure 3120 and the second microstructure 3122 can also have different heights.

There is an interval between the first microstructure 3120 and the second microstructure 3122. A size of the interval is in a range from $0.5\lambda$ to about $2\lambda$. In one embodiment, the size of the interval between the first microstructure 3120 and the second microstructure 3122 is $\lambda$.

While the height and the width of the first microstructure 3120 are both in a range from about $0.5\lambda$ to about $2\lambda$, and the height and the diameter of the second microstructure 3122 are both in a range from about $0.5\lambda$ to about $2\lambda$, then the laser beam obtained by the laser 30 will have a relatively small divergence angle and spot size.

The other components of the laser 30 are all the same as that of the laser 10.

Figure 14:
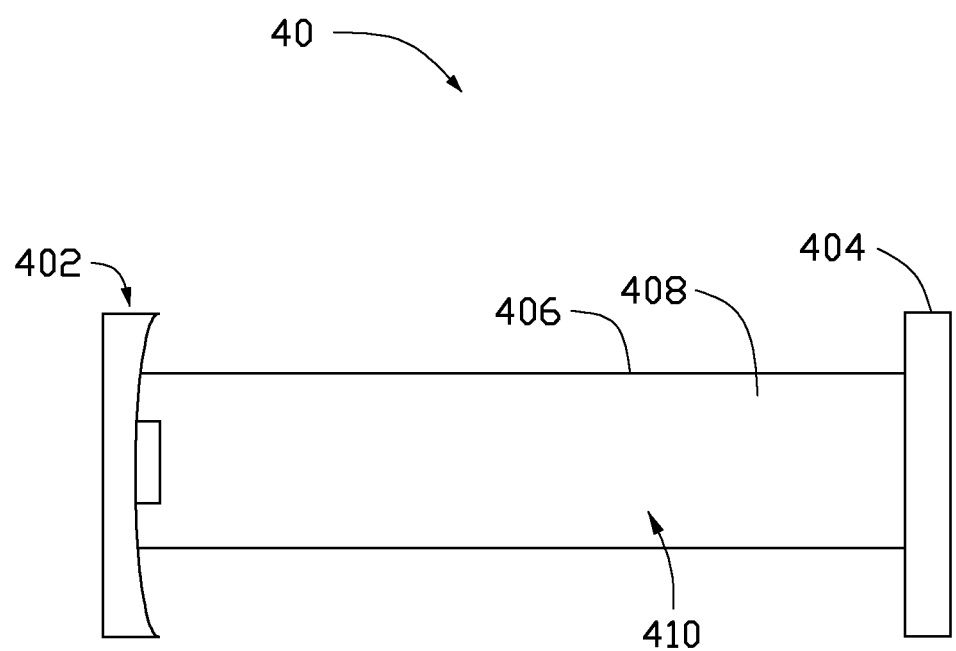
FIG. 14 is a schematic diagram of a laser according to another embodiment.

FIG. 14 shows that a laser 40 of another embodiment includes a total reflective mirror 402, an output mirror 404, a discharge lamp 406, and an active laser medium 408. The total reflective mirror 402 and the output mirror 404 are separately configured on two opposite ends of the discharge lamp 406. The total reflective mirror 402, the output mirror 404, and the discharge lamp 406 define a resonant cavity 410. The active laser medium 408 is filled in the resonant cavity 410.

Figure 15:
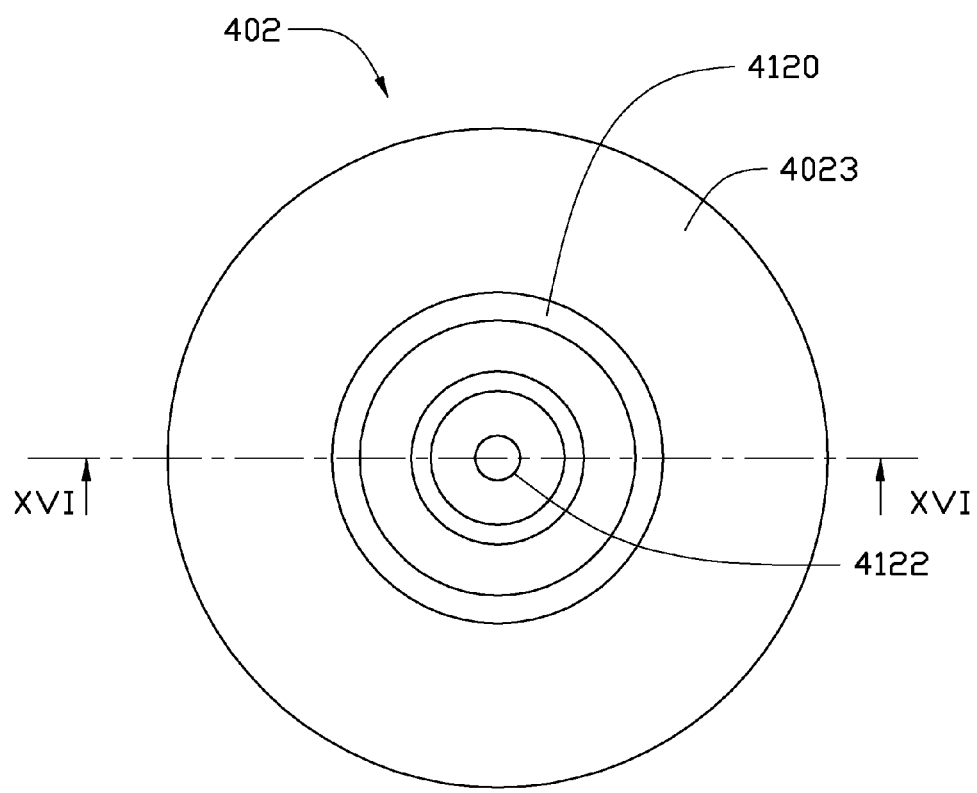
FIG. 15 is a plan view of a total reflective mirror of FIG. 14.

FIG. 15 shows that the total reflective mirror 402 includes a body 4020 defining a first reflective surface 4021, and a metal film 4022 coated on the first reflective surface 4021 of the body 4020. The metal film 4022 has a second reflective surface 4023, which faces the output mirror 404. Different from the laser 30, the total reflective mirror 402 further includes a plurality of first microstructures 4120 and a second microstructure 4122. The plurality of first microstructures 4120 and the second microstructure 4122 are concentrically configured.

Figure 16:
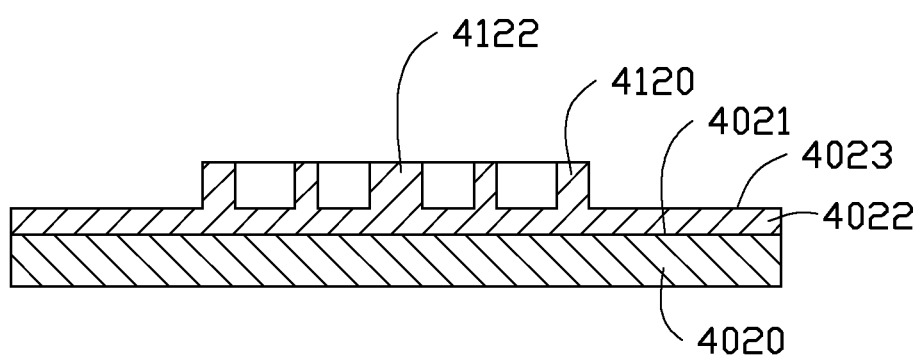
FIG. 16 is a cross-sectional view of the total reflective mirror of FIG. 14 according to one embodiment.

FIG. 16 shows that in one embodiment, both the plurality of first microstructures 4120 and the second microstructure 4122 protrude from the second reflective surface 4023 of the metal film 4022. Both the plurality of first microstructures 4120 and the second microstructure 4122 are located close to a center of the second reflective surface 4023. In one embodiment, the center of the second reflective surface 4023 is set as a center of both the plurality of first microstructures 4120 and the second microstructure 4122. The material for both the plurality of first microstructures 4120 and the second microstructure 4122 are the same as that of the metal film 4022. Both the plurality of first microstructures 4120 and the second microstructure 4122 can be formed on the second reflective surface 4023 by electroplating, depositing, sputtering, spraying, or any other coating methods with the aid of a mask. In one embodiment, the plurality of first microstructures 4120, the second microstructure 4122, and the metal film 4022 are formed as one piece.

Figure 17:
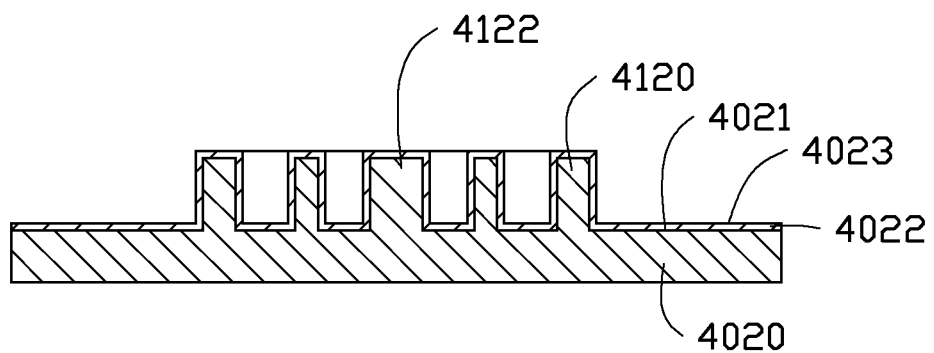
FIG. 17 is a cross-sectional view of the total reflective mirror of FIG. 14 according to another embodiment.

FIG. 17 shows that in another embodiment, both the plurality of first microstructures 4120 and the second microstructure 4122 protrude from the first reflective surface 4021 of the body 4020. The metal film 4022 covers the first reflective surface 4021, the plurality of first microstructures 4120, and the second microstructure 4122. Both the plurality of first microstructures 4120 and the second microstructure 4122 are located close to a center of the first reflective surface 4021. In one embodiment, the center of the first reflective surface 4023 is set as a center of both the plurality of first microstructures 4120 and the second microstructure 4122. The material for both the plurality of first microstructures 4120 and the second microstructure 4122 are the same as that of the body 4020. Both the plurality of first microstructures 4120 and the second microstructure 4122 can be formed by etching the body 4020 with the aid of a mask. In one embodiment, the plurality of first microstructures 4120, the second microstructure 4122, and the body 4020 are formed as one piece.

The shape, structure, and range of size of the plurality of first microstructures 4120 are the same of that of the first microstructure 3120.

The shape, structure, and size of the second microstructure 4122 are all the same of that of the second microstructure 3122.

The plurality of first microstructures 4120 and the second microstructure 4122 can have a same height. In one embodiment, the same height is $0.5\lambda$. The first plurality of microstructures 4120 and the second microstructure 4122 can also have different heights.

There is an interval between each two adjacent first microstructures 4120 or between the adjacent first microstructure 4120 and second microstructure 4122. Each interval has a size ranging from $0.5\lambda$ to about $2\lambda$. In one embodiment, each interval has a same size. In one embodiment, the same size of the interval is $\lambda$.

The other components of the laser 40 are all the same as that of the laser 30.

Compared with the laser 30 having one first microstructure 3120, the laser 40 has a plurality of first microstructures 4120 additionally, each interval between each two adjacent microstructures 4120 and 4122 has a size ranging from about $0.5\lambda$ to about $2\lambda$, therefore, the surface plasma resonance produced in the resonant cavity 410 is more remarkable. A laser beam which has a long depth of focus, and low power density loss during long distance transmission can then be obtained.

The laser beam obtained by the laser 10, 20, 30 or 40 in present disclosure has a high quality beam, a long depth of focus, and a high power density in the beam center. Therefore, the laser beam can be easily applied in cutting or welding, especially in long distance transmission or commutation.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A laser comprising:
a total reflective mirror comprising a body defining a first reflective surface, a metal film entirely coated on the first reflective surface, and at least one microstructure located on the metal film, the at least one microstructure is a convex ring-shaped structure, wherein a space is defined by the convex ring-shaped structure, the convex ring-shaped structure surrounds the space, and the metal film is sandwiched between the first reflective surface and the convex ring-shaped structure;
an output mirror;
a discharge lamp comprises two opposite ends, wherein the total reflective mirror and the output mirror are located separately on the two opposite ends of the discharge lamp; and
an active laser medium;
wherein the total reflective mirror, the output mirror, and the discharge lamp define a resonant cavity, and the active laser medium is filled in the resonant cavity.

2. The laser as claimed in claim 1, wherein the at least one microstructure protrudes from the first reflective surface.

3. The laser as claimed in claim 1, wherein the metal film has a second reflective surface and the at least one microstructure protrudes from the second reflective surface.

4. The laser as claimed in claim 1, wherein the laser has a working wavelength $\lambda$, and a height of the at least one microstructure is in a range from about $0.5\lambda$ to about $2\lambda$.

5. The laser as claimed in claim 4, wherein a width of the at least one microstructure is in a range from about $0.5\lambda$ to about $22\lambda$.

6. The laser as claimed in claim 1, wherein the total reflective mirror comprises a plurality of microstructures concentrically configured.

7. The laser as claimed in claim 6, wherein the laser has a working wavelength $\lambda$, and each of the plurality of microstructures has a height ranging from about $0.5\lambda$ to about $2\lambda$.

8. The laser as claimed in claim 7, wherein the plurality of microstructures has a same height of $0.5\lambda$.

9. The laser as claimed in claim 7, wherein each of the plurality of microstructures has a width ranging from about $0.5\lambda$ to about $2\lambda$.

10. The laser as claimed in claim 9, wherein the plurality of microstructures has a same width of $0.5\lambda$.

11. The laser as claimed in claim 7, wherein an interval is defined between each two adjacent microstructures, and each interval has a size ranging from about $0.5\lambda$ to about $2\lambda$.

12. The laser as claimed in claim 11, wherein the intervals have a same size of $\lambda$.

13. A laser comprising:
a total reflective mirror comprising a body defining a first reflective surface, a metal film entirely coated on the first reflective surface, the metal film comprising a first surface and a second surface opposite to the first surface, and the first surface is adhered to the first reflective surface; wherein the total reflective mirror further comprises a first microstructure and a second microstructure located on the second surface of the metal film, the first microstructure is a convex ring-shaped structure defining a space surrounded by the convex ring-shaped structure, the second microstructure is a cylinder located in the space and surrounded by the convex ring-shaped structure, the first microstructure and the second microstructure are concentrically configured, and the first microstructure and the second microstructure is spaced to the first reflective surface via the metal layer;
an output mirror;

a discharge lamp comprising two opposite ends, wherein the total reflective mirror and the output mirror are located separately on the two opposite ends of the discharge lamp; and an active laser medium;

wherein the total reflective mirror, the output mirror, and the discharge lamp define a resonant cavity, and the active laser medium is filled in the resonant cavity.

14. The laser as claimed in claim 13, wherein the laser has a working wavelength $\lambda$, and a height of the first microstructure is in a range from about $0.5\lambda$ to about $2\lambda$.

15. The laser as claimed in claim 14, wherein a width of the first microstructure is in a range from about $0.5\lambda$ to about $2\lambda$.

16. The laser as claimed in claim 13, wherein the laser has a working wavelength $\lambda$, and a height of the second microstructure is in a range from about $0.5\lambda$ to about $2\lambda$.

17. The laser as claimed in claim 16, wherein a diameter of the second microstructure is in a range from about $0.5\lambda$ to about $2\lambda$.

18. The laser as claimed in claim 13, wherein the total reflective mirror comprises a plurality of first microstructures and plurality of second microstructures, each of the plurality of first microstructures is concentrically configured with one of the plurality of second microstructures.

19. The laser as claimed in claim 18, wherein an interval is defined between each two adjacent first microstructures, and each interval has a size ranging from $0.5\lambda$ to about $2\lambda$.

20. The laser as claimed in claim 19, wherein the intervals have a same size of $\lambda$.

\* \* \* \* \*